United States Patent [19]

Otani et al.

[11] Patent Number: 5,375,009
[45] Date of Patent: Dec. 20, 1994

[54] OPTICAL ISOLATOR DEVICE HAVING A WIDER CUTOFF WAVELENGTH BAND FOR A RETURN LIGHT BEAM

[75] Inventors: Yukitoshi Otani; Kenichi Koike, both of Tokyo, Japan

[73] Assignee: Hoya Corporation, Tokyo, Japan

[21] Appl. No.: 111,019

[22] Filed: Aug. 24, 1993

Related U.S. Application Data

[63] Continuation of Ser. No. 872,630, Apr. 22, 1992, abandoned.

[30] Foreign Application Priority Data

Apr. 26, 1991 [JP] Japan .................................. 3-097204

[51] Int. Cl.⁵ .......................... G02B 5/30; G02F 1/09; G02F 1/095
[52] U.S. Cl. .................... 359/282; 359/484; 372/703
[58] Field of Search ............... 359/280, 281, 282, 283, 359/484; 372/703

[56] References Cited

U.S. PATENT DOCUMENTS

| | | | |
|---|---|---|---|
| 4,756,607 | 7/1988 | Watanabe et al. | 359/282 |
| 5,105,307 | 4/1992 | Nishiyama et al. | 359/484 |

FOREIGN PATENT DOCUMENTS

| | | | |
|---|---|---|---|
| 57-62024 | 4/1982 | Japan | 359/484 |
| 61-121027 | 6/1986 | Japan | 359/484 |
| 61-147224 | 7/1986 | Japan | 359/484 |
| 189422 | 8/1987 | Japan | |
| 1-20521 | 1/1989 | Japan | 359/484 |
| 1-20523 | 1/1989 | Japan | 359/484 |
| 3-75614 | 3/1991 | Japan | 359/484 |

*Primary Examiner*—Martin Lerner
*Attorney, Agent, or Firm*—Ladas & Parry

[57] ABSTRACT

In an optical isolator device comprising a plurality of optical isolator elements each of which comprises a pair of polarizers and a magneto-optical element disposed between said polarizers, the optical isolator elements have element cutoff wavelength bands which are different from one another. The optical isolator elements are arranged in series with an optical axis in common. Each element cutoff wavelength band is defined by an element cutoff central wavelength for a return light beam. The optical isolator device has a device cutoff wavelength band for the return light beam that is defined by a device cutoff central wavelength. When the optical isolator elements are equal in number to two, both of the optical isolator elements have a common wavelength area where the element cutoff wavelength bands overlap each other. One of the optical isolator elements has an element cutoff central wavelength shorter than the device cutoff central wavelength, while another of the optical isolator elements has another element cutoff central wavelength longer than the device cutoff central wavelength.

6 Claims, 7 Drawing Sheets

FIG. I  PRIOR ART

OPTICAL ISOLATOR DEVICE HAVING A WIDER CUTOFF WAVELENGTH BAND FOR A RETURN LIGHT BEAM

This is a continuation of copending application Ser. No. 07/872,630 filed on Apr. 22, 1992, now abandoned.

BACKGROUND OF THE INVENTION

This invention relates to an optical isolator device transmitting an incoming light beam which is propagated through the optical isolator device along a forward direction and cutting off a return light beam which is propagated through the optical isolator device along a backward direction opposite to the forward direction.

As well known in the art, an optical isolator device is for use in an optical fiber transmission system which comprises a light source, such as a semiconductor laser device and an optical fiber. The optical isolator device is disposed between the light source and the optical fiber. The light source emits a light beam which is incident as an incoming light beam onto an incident end of the optical isolator device. The optical isolator device transmits the incoming light beam which is propagated through the optical isolator device along a forward direction. From an outgoing end of the optical isolator device, the incoming light beam is incident as an outgoing light beam onto an incident end of the optical fiber. A part of the outgoing light beam is reflected on the incident end of the optical fiber as a reflected light beam. Therefore, the reflected light beam is returned as a return light beam to the outgoing end of the optical isolator device. The return light beam is propagated through the optical isolator device along a backward direction opposite to the forward direction. The return light beam is cut off by the optical isolator device to prevent the light source from receiving the return light beam. As a result, the light source operates with stability and the optical fiber transmission system operates at a high optical transmission quality.

A known optical isolator device comprises first Faraday rotator which is disposed between the first and the second polarizers. The first and the second polarizers are arranged along a common optical axis and have first and second planes of polarization which are inclined at 45° to each other.

The incoming light beam, which is propagated along the forward direction, is incident on the first polarizer of the optical isolator device. The first polarizer polarizes the incoming light beam into a linearly polarized light beam with a plane of polarization which coincides with the first plane of polarization. The linearly polarized light beam is sent to the magneto-optical element. The magneto-optical element rotates the plane of polarization of the linearly polarized light beam to produce a rotated light beam with a plane of polarization which is inclined at 45° to the first plane of polarization and which coincides with the second plane of polarization. The rotated light beam passes through the second polarizer as an outgoing light beam from the optical isolator device. A part of the outgoing light beam is reflected as the reflected light beam on an incoming/outgoing end of an external optical element, such as an optical fiber.

The reflected light beam is returned to the second polarizer as a returned light beam. The returned light beam is propagated along the backward direction opposite to the forward direction. The returned light beam is incident on the second polarizer. The second polarizer polarizes the returned light beam into another linearly polarized light beam with a plane of polarization which coincides with the second plane of polarization. The linearly polarized light beam is sent to the magneto-optical element. The magneto-optical element rotates the plane of polarization of the linearly polarized light beam to produce another rotated light beam with a plane of polarization which is inclined at 45° to the second plane of polarization and which is orthogonal to the first plane of polarization. Therefore, the rotated light beam does not pass through the first polarizer, whereby the first polarizer cuts off propagation of the rotated light beam.

The above-described optical isolator device, which comprises the pair of the polarizers and the magneto-optical element, is called a single optical isolator. This is because the above-described optical isolator device is a minimum unit which acts as the optical isolator device. It will be noted here throughout the instant specification that the single optical isolator may be referred to as an optical isolator element. As well known in the art, the optical isolator device is generally characterized by an isolation characteristic which represents a difference between a ratio of intensity of an incoming light beam to intensity of an outgoing light beam in a case of passing the light beam of a predetermined intensity through the optical isolator device in the forward direction as the incoming light beam and another ratio of intensity of an incoming light beam to intensity of an outgoing light beam in another case of passing the light beam of the predetermined intensity through the optical isolator device in the backward direction as the incoming light beam. The single optical isolator normally has an isolation characteristic of −30 dB.

However, this isolation characteristic is insufficient in a case where it is necessary for the semiconductor laser device to operate at a high stability for an oscillation frequency or the like. In order to obtain a higher isolation characteristic, an optical isolator device of a high-isolation type has been proposed, for example, in Japanese Unexamined Patent Prepublication of Kôkai No. Shô62-189,422, namely, 189,422/1987. The proposed optical isolator device comprises two optical isolator elements which are arranged in series along a common axis, thereby obtaining an higher isolation characteristic greater than −60 dB.

A conventional optical isolator device of the high-isolation type, such as the proposed optical isolator device is, however, disadvantageous in that it is impossible to obtain a sufficient isolation characteristic in a wavelength range apart from an oscillation wavelength of a laser light beam when the optical isolator device is for use in cutting off a return light beam which is sent to the semiconductor laser device. This is because each polarizer in the optical isolator device is a polarizing beam splitter which has a relatively narrow polarizer cutoff wavelength band. Polarizers having a relatively wider polarizer cutoff wavelength bands, such as polarizers made of, for example, calcite, rutile, or the like are extremely expensive.

SUMMARY OF THE INVENTION:

It is therefore an object of this invention to provide an optical isolator device which has a wider cutoff wavelength band for a return light beam.

It is another object of this invention to provide an optical isolator device of the type described, which is cheap.

Other objects of this invention will become clear as the description proceeds.

According to the invention, the optical isolator device comprises a plurality of optical isolator elements each of which comprises a pair of polarizers and a magneto-optical element disposed between the polarizers. The optical isolator elements are arranged in series along a common optical axis. Each of the optical isolator elements has an element cutoff wavelength band for the return light beam that is defined by an element cutoff central wavelength.

According to the invention, the optical isolator elements have different cutoff wavelength bands.

DESCRIPTION OF THE PREFERRED EMBODIMENTS

Figure 1:
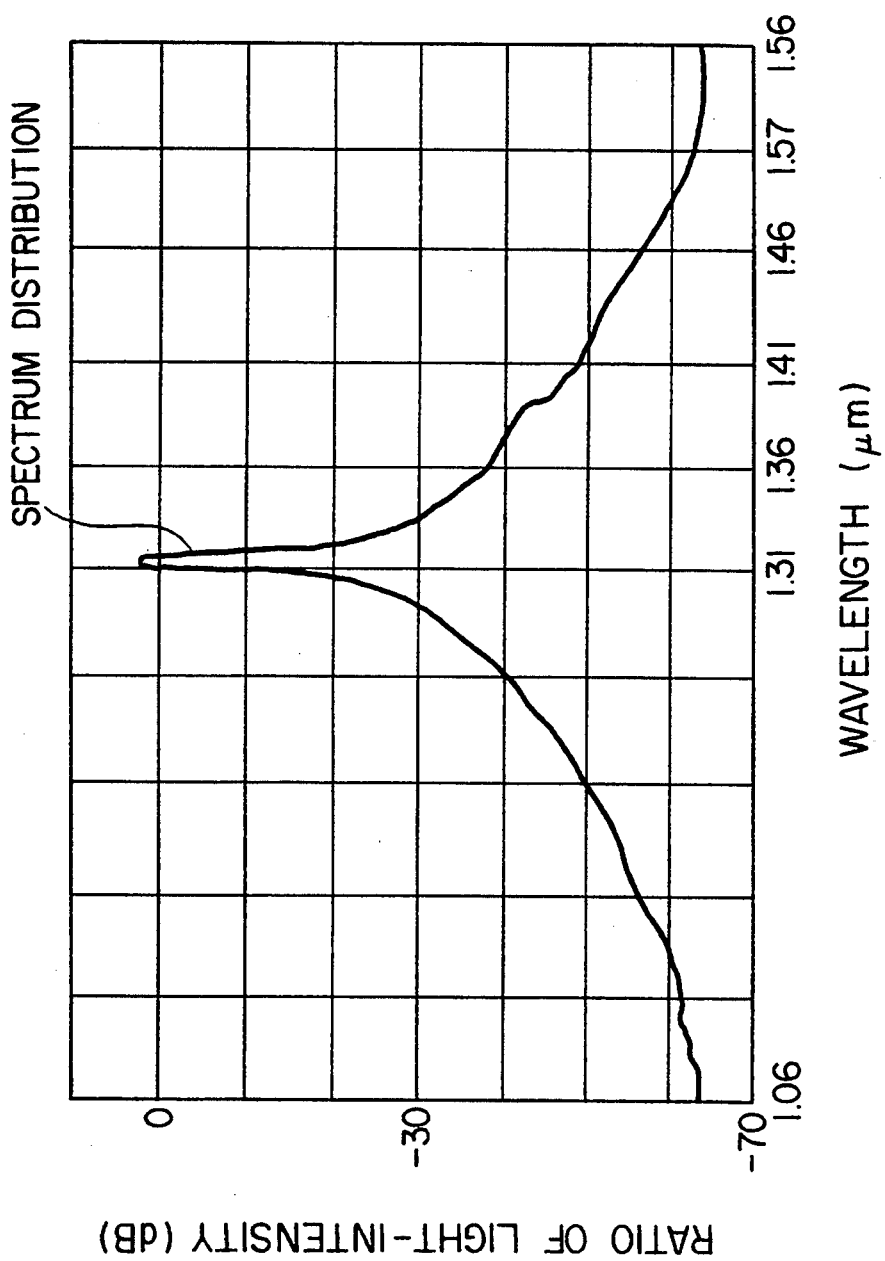
FIG. 1 shows a spectrum distribution of a laser light beam emitted by a semiconductor laser device having an oscillation wavelength of 1.31 μm.

Referring to FIG. 1, description will proceed to a spectrum distribution of a laser light beam emitted by a semiconductor laser device having an oscillation wavelength of 1.31 μm. In FIG. 1, the abscissa and the ordinate represent wavelength (μm) and ratio of light-intensity (dB), respectively. The spectrum distribution has a peak at about 1.31 μm and is spread between 1.10 μm and 1.50 μm. Measurement of the ratio of light-intensity in the spectrum distribution has been made as follows. The laser light beam emitted by the semiconductor laser device has been incident onto an incident end of an above-mentioned conventional optical isolator device of high isolation type along a forward direction thereof. Measurement has been made as regards the light-intensity of an outgoing light beam from an outgoing end of the optical isolator device. The ratio of light-intensity of the spectrum distribution has been obtained by calculating the ratio of the light-intensity of the outgoing light beam to a peak light-intensity of the oscillation wavelength of the laser light beam emitted by the semiconductor laser device. As apparent from FIG. 1, the spectrum distribution has same degree of light-intensity below 1.4 μm.

Figure 2:
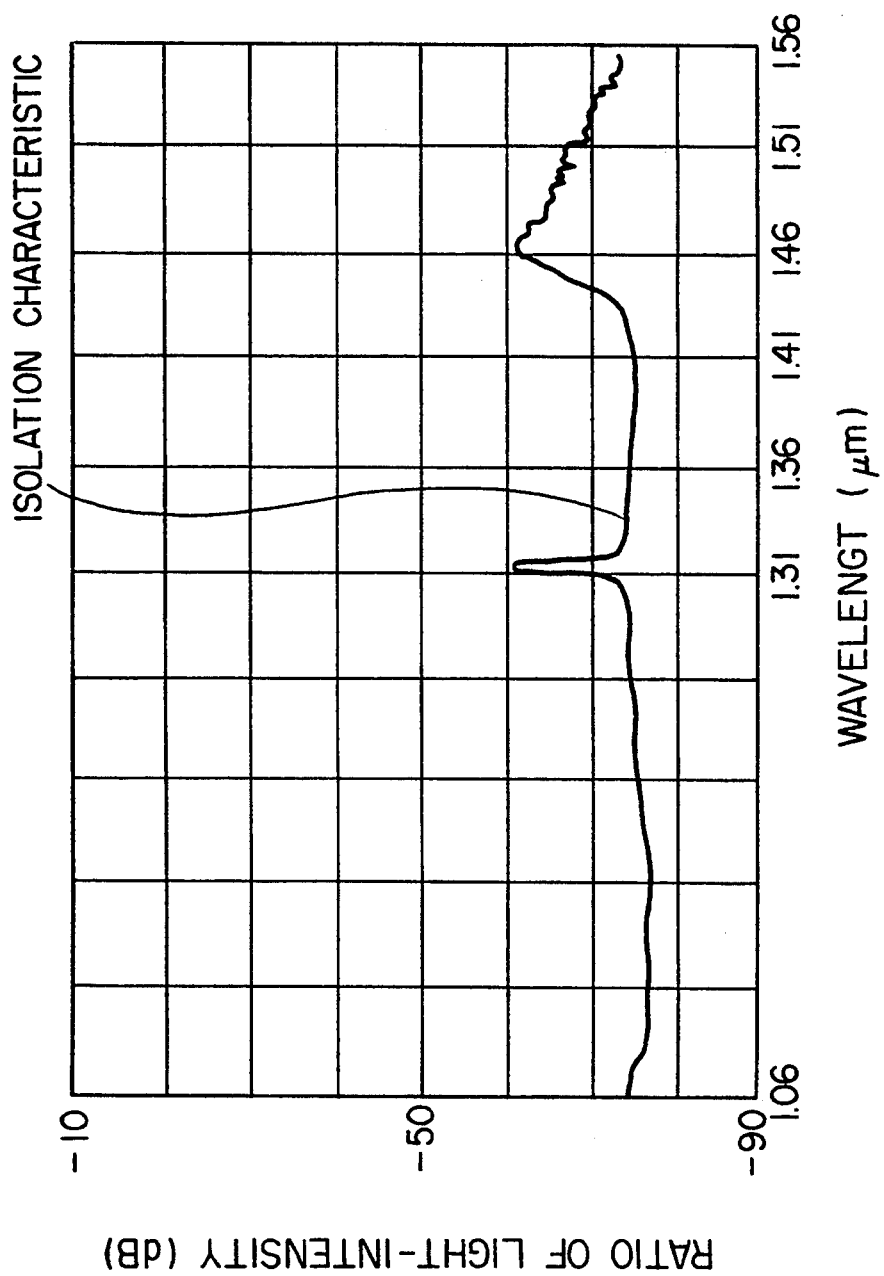
FIG. 2 shows an isolation characteristic of a conventional optical isolator device.

Turning to FIG. 2, description will proceed to an isolation characteristic of the conventional isolator device. In FIG. 2, the abscissa and the ordinate represent wavelength (μm) and ratio of light-intensity (dB), respectively. The isolation characteristic is obtained by measuring the light-intensity of a leaked light beam at the incident end of the conventional isolator device in the case where the laser light beam having the spectrum distribution shown in FIG. 1 is incident onto the outgoing end of the conventional isolator device along a backward direction thereof.

As apparent from FIG. 2, the conventional isolator device cannot cutoff a noise light beam in the wavelength range lower than 1.4 μm whereby a noise light beam with an intensity level substantially equal to that at the oscillation frequency is producted in the spectrum distribution as shown in FIG. 1. When the noise light beam is incident on the semiconductor laser device, the noise light beam disturbs the laser oscillation of the semiconductor laser device.

The present inventors have eliminated this cause of disturbance of the laser oscillation. The present inventors have found that this is due to the fact that each polarizer used in the conventional isolator device has a polarizer cutoff wavelength band which is not shorter than 1.4 μm.

Figure 3:
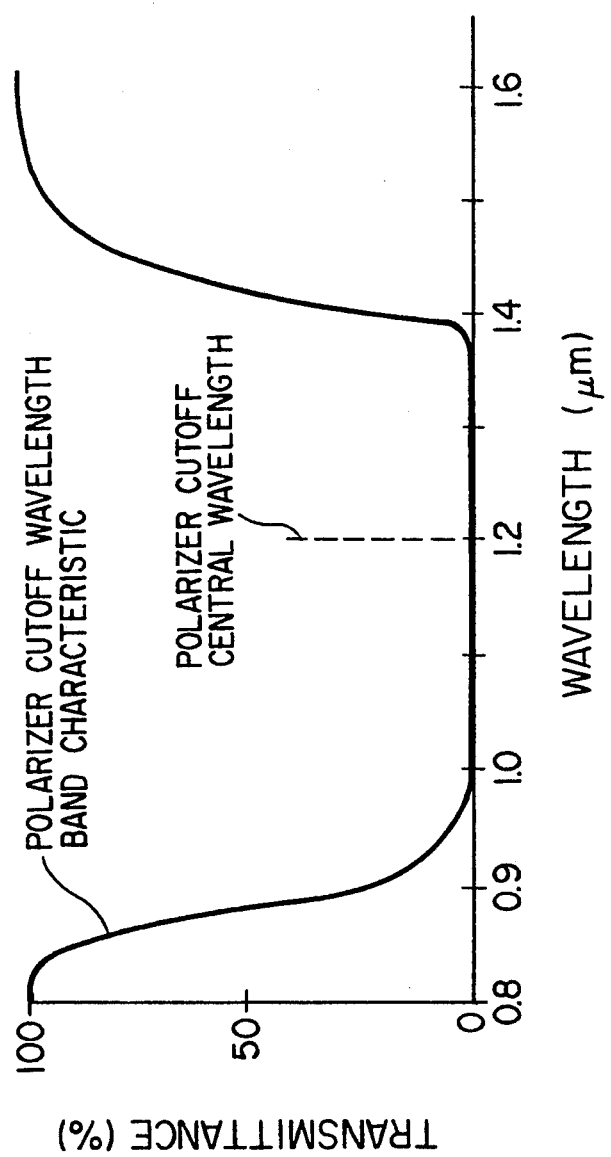
FIG. 3 shows a characteristic of a polarizer cutoff wavelength band of each polarizer used in the conventional optical isolator device.

Turning to FIG. 3, description will proceed to a characteristic of the polarizer cutoff wavelength band of each polarizer used in the conventional optical isolator device. In FIG. 3, the abscissa and the ordinate represent wavelength (μm) and transmittance (%), respectively.

As well known in the art, a light beam has an electric vector and a magnetic vector. The light beam is divided into a p component and an s component. The p component of the light beam is present in a plane which includes the electric vector of the light beam and a propagation direction of the light beam. Such a plane is called an incident plane. The s component of the light beam is orthogonal to the incident plane. A polarizing beam splitter separates the light beam into two polarized light beams which are orthogonal to each other. One of the polarized light beams has only the p component thereby being called a p-polarized light beam while another has only the s component and thereby is referred to as an s-polarized light beam. More specifically, the polarizing beam splitter has the function to transmit the p-polarized light beam and to reflect the s-polarized light beam at a right angle to the incident plane.

In the conventional optical isolator device, each polarizer is generally the polarizing beam splitter, such as a cube-type beam splitter attached to a polarizing film. Such a polarizing beam splitter has a relatively narrower polarizer cutoff wavelength band FIG. 3 shows a polarizer cutoff wavelength band characteristic of the s-polarized light beam for each polarizer used in the conventional optical isolator device. The polarizer cutoff wavelength band characteristic represents a wavelength dependence characteristic of the transmittance for a linearly polarized light beam having a plane of polarization orthogonal to that in which the p-polarized light beam transmits. As shown in FIG. 3, the polarizer cutoff wavelength band characteristic has a wavelength range between about 0.9 μm and 1.4 μm where the transmittance is equal to zero when the polarizer has a polarizer cutoff central wavelength of 1.2 μm. As a result, it is impossible, in the conventional isolator device, to cut off the noise light beam having the wavelength range which is not shorter than a wavelength of 1.4 μm. Therefore, the conventional isolator device is defective in that it is impossible to obtain a sufficient isolation characteristic in the wavelength range apart from the oscillation wavelength of the laser light beam, as described herein before in the instant specification.

Figure 4:
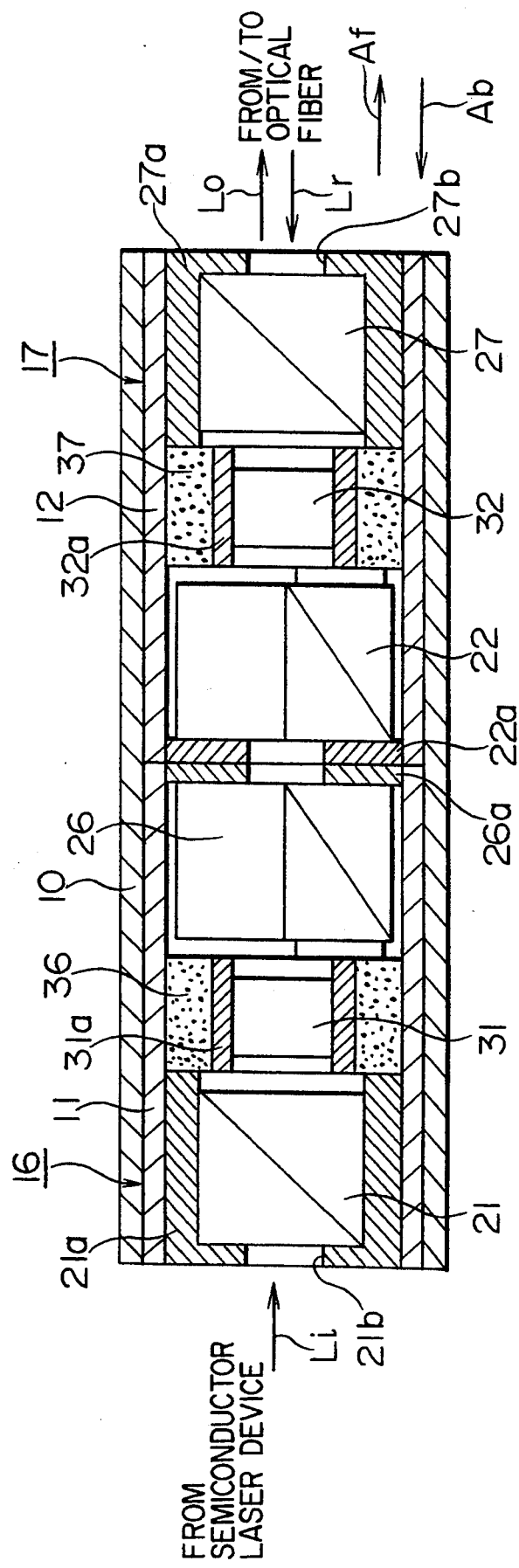
FIG. 4 is a schematic cross sectional view of an optical isolator device according to a preferred embodiment of this invention.

Referring to FIG. 4, description will proceed to an optical isolator device according to a preferred embodiment of this invention. The optical isolator device transmits an incoming light beam Li which is propagated through the optical isolator device along a forward direction depicted by arrow Af and cuts off a return light beam Lr which is propagated through the optical isolator device along a backward direction which is depicted by arrow Ab and which is opposite to the forward direction Af. As will become clear as the description proceeds, the illustrated optical isolator device comprises two optical isolator elements which are arranged in series along a common optical axis and which have element cutoff wavelength bands which are different from each other. The optical isolator device has a cutoff central wavelength of 1.31 μm and has a wider cutoff wavelength band, as will become clear as the description proceeds.

The optical isolator device is disposed between a semiconductor laser device (not shown) and an incident end of an optical fiber (not shown). The semiconductor laser device emits a laser light beam having an oscillation wavelength of 1.31 μm and the spectrum distribution as shown in FIG. 1. The laser light beam is incident as the incoming light beam Li onto an incident end of the optical isolator device.

The optical isolator device comprises a housing 10 which has a cylindrical configuration with first and second housing ends located at the lefthand and righthand sides of FIG. 4, respectively, and an inner space.

The optical isolator device comprises first and second cylindrical cases 11 and 12 which are inserted in the housing 10 at the lefthand and righthand sides of FIG. 4. Each of the first and the second cylindrical cases 11 and 12 has a length which is equal to one-half the length of the housing 10. Each of the first and the second cylindrical cases 11 and 12 has an outer diameter which is substantially equal to the inner diameter of the housing 10. Therefore, the first and second cylindrical cases 11 and 12 became rigidly fixed in the housing 10 after the first and the second cylindrical cases 11 and 12 are inserted in the housing 10.

The first cylindrical case 11 is in a first optical isolator element 16 while the second cylindrical case 12 is in a second optical isolator element 17. The first optical isolator element 16 is disposed at a side where the incoming light beam Li is incident while the second optical isolator element 17 is disposed at the opposite side where the outgoing light beam Lo exits. Therefore, the first optical isolator element 16 may be called an incident-side single optical isolator while the second optical isolator element 17 may be referred to as an outgoing-side single optical isolator.

As well known in the art, an optical isolator element comprises generally a pair of polarizers and a magneto-optical element disposed between the polarizers. One of the polarizers may be called an analyzer.

The first and the second optical isolator elements 16 and 17 respectively comprise first and second polarizers 21 and 22, first and second analyzers 26 and 27, and first and second magneto-optical elements 31 and 32. The first magneto-optical element 31 is disposed between the first polarizer 21 and the first analyzer 26 while the second magneto-optical element 32 is disposed between the second polarizer 22 and the second analyzer 27.

The first polarizer 21 has a first plane of polarization while the first analyzer 26 has a second plane of polarization. The first plane of polarization is inclined at 45° relative to the second plane of polarization. The second polarizer 22 has a third plane of polarization while the second analyzer 27 has a fourth plane of polarization. The third plane of polarization is inclined at 45° relative to the fourth plane of polarization and coincides with the second plane of polarization.

Figure 5:
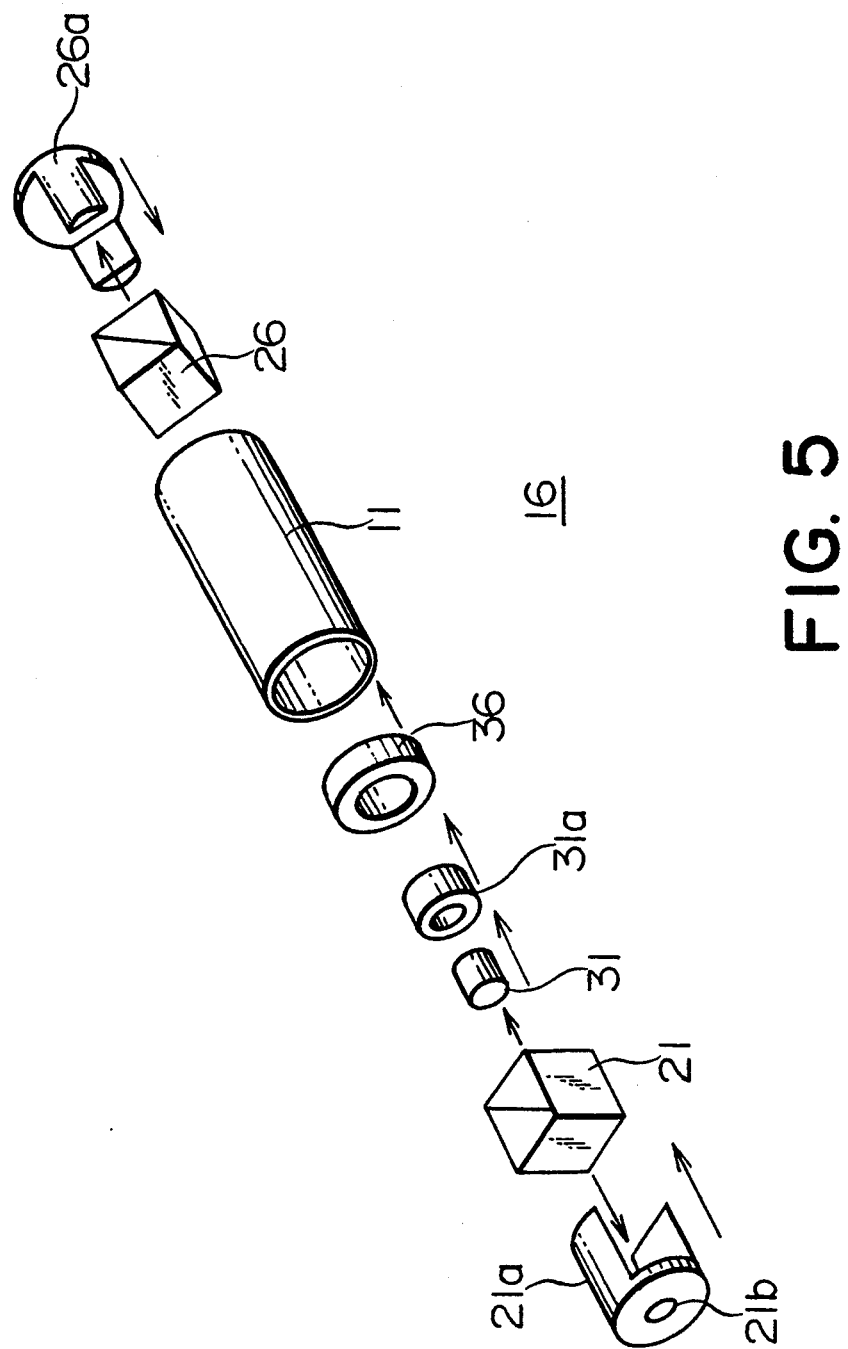
FIG. 5 is an exploded perspective view of an incident side single optical isolator for use in the optical isolator device illustrated in FIG. 4.

Turning to FIG. 5 in addition to FIG. 4, in the first cylindrical case 11 are disposed and fixed to the first polarizer 21, the first analyzer 26, and the first magneto-optical element 31 along a common optical axis, as will become clear as the description proceeds. The first polarizer 21 is held in a first polarizer holder 21a while the first analyzer 26 is held in a first analyzer holder 26a. Each of the first polarizer holder 21a and the first analyzer holder 26a has a substantially cylindrical configuration with a part thereof cut away. The first magneto-optical element 31 is held in a first cylindrical holder 31a. The first magneto-optical element 31 is surrounded by a first ring-shaped magnet 36 through the first cylindrical holder 31a with the first ring-shaped magnet 36 sandwiched between the first polarizer holder 21a and the first analyzer holder 26a. In this configuration, the first polarizer 21 and the first analyzer 26 are arranged with the first and the second planes of polarization inclined at 45° to each other. The incident-side single optical isolator 16 comprises the first polarizer 21, the first magneto-optical element 31, and the first analyzer 26 which are arranged from the lefthand side of FIG. 4 to the righthand side in the above-mentioned order along the common optical axis.

Turning back to FIG. 4, in the second cylindrical case 12 are disposed and fixed to the second polarizer 22, the second analyzer 27, and the second magneto-optical element 32 along the optical axis, The second polarizer 22 is held in a second polarizer holder 22a while the second analyzer 27 is held in a second analyzer holder 27a. Each of the second polarizer holder 22a and the second analyzer holder 27a has a substantially cylindrical configuration with a part thereof cut away. The second magneto-optical element 32 is held in a second cylindrical holder 32a. The second magneto-optical element 32 is surrounded by a second ring-shaped magnet 37 through the second cylindrical holder 32 with the second ring-shaped magnet 37 sandwiched between the second polarizer holder 22a and the second analyzer holder 27a. The second polarizer 22 and the second analyzer 27 are arranged with the third and the fourth planes of polarization inclined at 45° to each other. The outgoing-side single optical isolator 17 comprises the second polarizer 22, the second magneto-optical element 32, and the second analyzer 27 which are arranged from the lefthand side of FIG. 4 to the righthand side in the above-mentioned order along the common optical axis.

When the first cylindrical case 11 and the second cylindrical case 12 are inserted and fixed in the housing 10, the incident-side single optical isolator 16 and the outgoing-side single optical isolator 17 are arranged along the common optical axis with the first analyzer 26 and the second polarizer 22 adjoined to each other. The first polarizer holder 21a has at the incident end of the optical isolator device an opening defining an incident window 21b. The second analyzer holder 27a has at an outgoing end of the optical isolator device an opening defining an outgoing window 27b.

In the described embodiment, each of the first and the second polarizers 21 and 22 and the first and the second analyzers 26 and 27 is a polarizing beam splitter.

Figure 6:
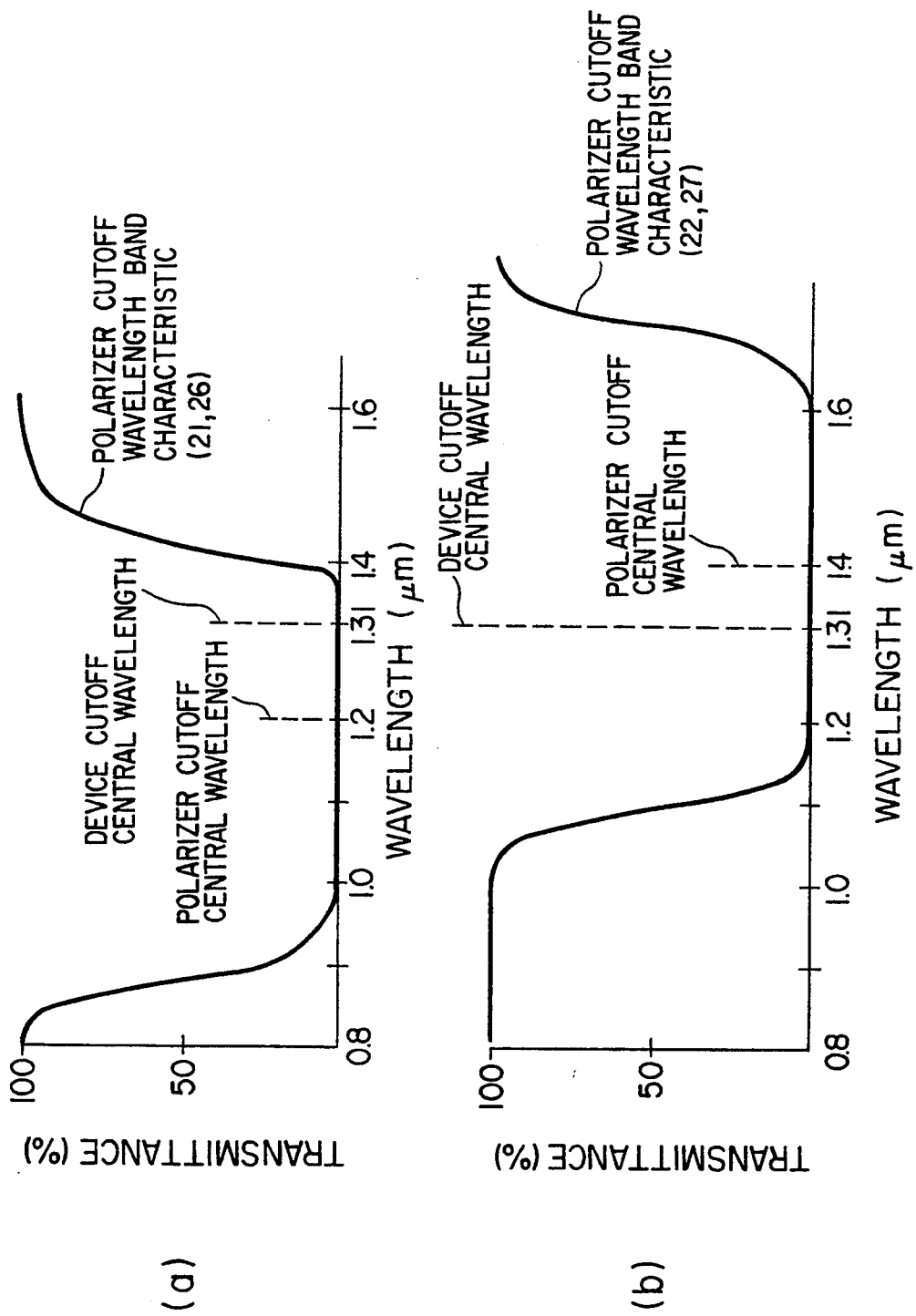
FIG. 6(a) and (b) show characteristics of polarizer cutoff wavelength bands of polarizers for use in the optical isolator device illustrated in FIG. 4.

FIG. 6(a) shows a polarizer cutoff wavelength band characteristic of the s-polarized light beam for each of the first polarizer 21 and the first analyzer 26. In FIG. 6(a), the abscissa and the ordinate represent wavelength ($\mu$m) and transmittance (%), respectively. As shown in FIG. 6(a), each of the first polarizer 21 and the first analyzer 26 has a polarizer cutoff central wavelength of 1.2 $\mu$m and the polarizer cutoff wavelength band characteristic which has a wavelength range between about 0.9 $\mu$m and 1.4 $\mu$m where the transmittance is equal to zero. Therefore, the first optical isolator element 16 has a first element cutoff central wavelength of 1.2 $\mu$m and an element cutoff wavelength band characteristic which has the wavelength range between about 0.9 $\mu$m and 1.4 $\mu$m where the transmittance is equal to zero.

FIG. 6(b) shows another polarizer cutoff wavelength band characteristic of the s-polarized light beam for each of the second polarizer 22 and the second analyzer 27. In FIG. 6(b), the abscissa and the ordinate represent wavelength ($\mu$m) and transmittance (%), respectively. As shown in FIG. 6(b), each of the second polarizer 22 and the second analyzer 27 has another polarizer cutoff central wavelength of 1.4 $\mu$m and the polarizer cutoff wavelength band characteristic which has another wavelength range between about 1.15 $\mu$m and 1.65 $\mu$m where the transmittance is equal to zero. Therefore, the second optical isolator element 17 has a second element cutoff central wavelength of 1.4 $\mu$m and another element cutoff wavelength band characteristic which has a wavelength range between about 1.15 $\mu$m and 1.65 $\mu$m where the transmittance is equal to zero.

As apparent from FIGS. 6(a) and (b), both of the first and the second optical isolator elements 16 and 17 have a common wavelength area between 1.15 $\mu$m and 1.4 $\mu$m where the first and the second element cutoff wavelength bands overlap each other. In other words, the first optical isolator element 16 has a first distinct wavelength area between 0.9 $\mu$m and 1.15 $\mu$um where the first and the second element cutoff wavelength bands do not overlap each other. The second optical isolator element 17 has a second distinct wavelength area between 1.4 $\mu$m and 1.65 $\mu$m where the first and the second element cutoff wavelength bands do not overlap each other. In addition, the first optical isolator element 16 has the first element cutoff central wavelength of 1.2 $\mu$m shorter than the device cutoff central wavelength of 1.31 $\mu$m. The second optical isolator element 17 has the second element cutoff central wavelength of 1.4 $\mu$m longer than the device cutoff central wavelength of 1.31 $\mu$m.

With this structure, it is possible to obtain an extremely high isolation characteristic in the common wavelength area with isolation characteristics in both of the first and the second optical isolator elements 16 and 17 overlapping to each other and to obtain a single isolation characteristic of each optical isolator element in the first and the second distinct wavelength areas.

Figure 7:
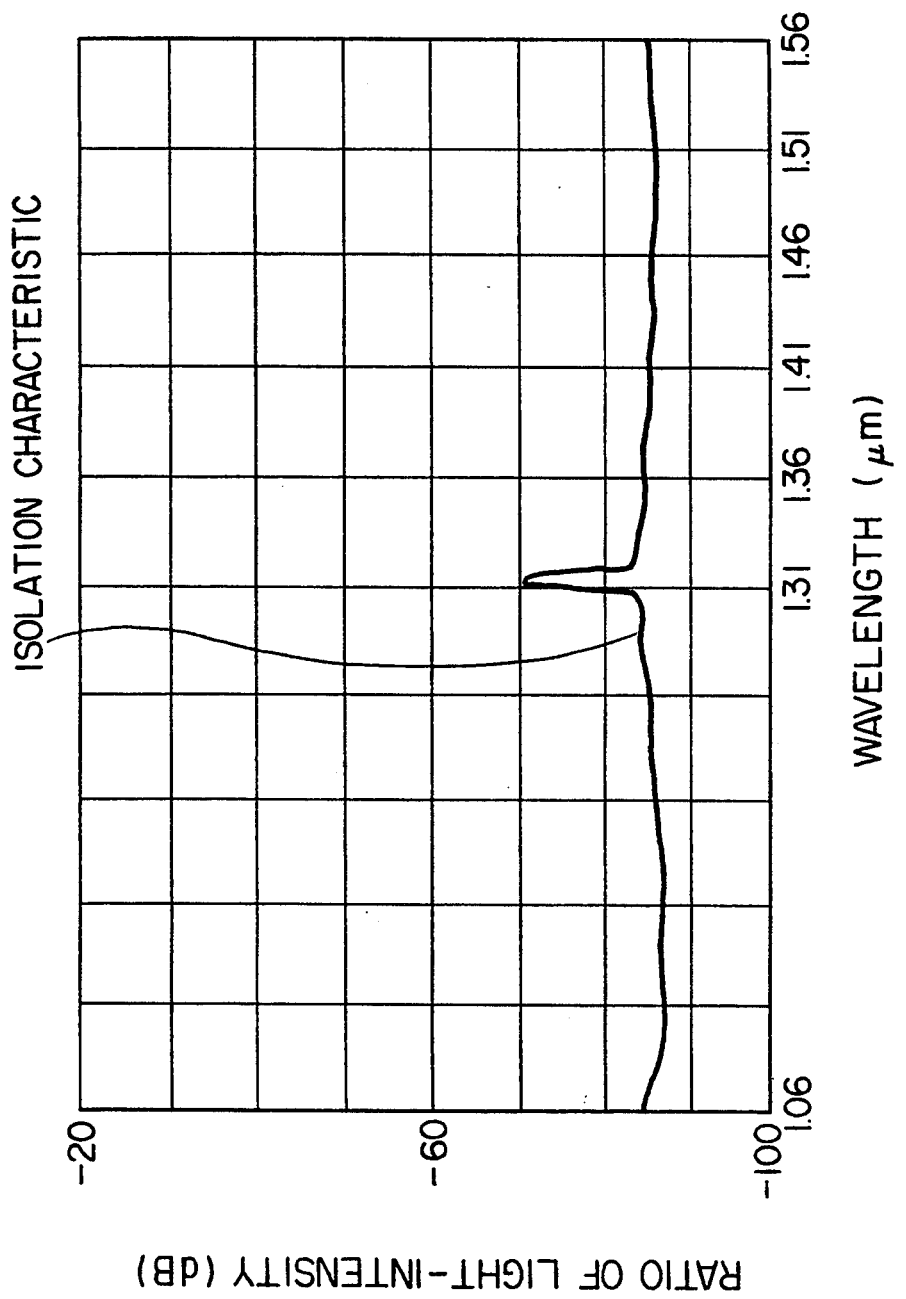
FIG. 7 shows an isolation characteristic of the optical isolator device illustrated in FIG. 4.

Turning to FIG. 7, description will proceed to an isolation characteristic of the optical isolator device illustrated in FIG. 4. In FIG. 7, the abscissa and the ordinate represent wavelength ($\mu$m) and ratio of light-intensity (dB), respectively.

As apparent from FIG. 7, on carrying out isolation for the laser light beam emitted by the semiconductor laser device having the spectrum distribution as shown in FIG. 1, it is possible to carry out the extremely high isolation on the laser light beam at the oscillation wavelength of 1.31 $\mu$m i.e. below $-70$ db and to carry out a sufficient isolation so as to cut off the noise light beam having a wavelength range which is longer than a wavelength of 1.4 $\mu$m.

Each of the first and the second magneto-optical elements 31 and 32 is made of a cylindrical YIG crystal having a composition represented by a chemical formula of $Y_3Fe_5O_{12}$. The cylindrical YIG crystal has flat opposed end surfaces parallel to each other. On each flat end surface, an antireflection film is coated. Inasmuch as the magneto-optical elements 31 and 32 have ferromagnetism, the magneto-optical elements 31 and 32 are put into a saturation state in a relatively small magnetic field having a strength of, for example, 1800 gausses. Each of the first and the second magneto-optical elements 31 and 32 has a Faraday effect which can rotate the plane of polarization of the linearly polarized light beam on the basis of the strength of the magnetic field. A rotation angle on the basis of the Faraday effect is called a Faraday rotation angle. Each of the first and the second magneto-optical elements 31 and 32 has a large Faraday rotation angle in the relatively small magnetic field.

In order to obtain the strength of the magnetic field where the Faraday rotation angle of each of the first and the second magneto-optical elements 31 and 32 is equal to 45° in a wavelength of 1.3 $\mu$m, each of the first and the second magnets 36 and 37 comprises a cylindrical Sm-Co permanent magnet. Each of the first and the second magnets 36 and 37 has end surfaces which present the north and the south poles. The first and the second magnets 36 and 37 generate magnetic fields in directions parallel to the optical axes of the first and the second magneto-optical elements 31 and 32, respectively.

While this invention has thus far been described in conjunction with the preferred embodiments thereof, it will now readily be possible for those skilled in the art to develop various other embodiments of this invention. For example, the optical isolator device may comprise a plurality of optical isolator elements which are in number greater than two. In addition, the polarizer may be a polarizing glass instead of the polarizing beam splitter. Such a polarizing glass is, for example, sold under the trade name "CORNING8612 POLARCOR " by Corning Glass Works. Furthermore, the polarizer and the analyzer in each optical isolator element may have different polarizer cutoff wavelength band characteristics.

What is claimed is:

1. In an optical isolator device for use in an optical fiber transmission system which comprises a semiconductor laser device and an optical fiber, said optical isolator device being disposed between said semiconductor laser device and said optical fiber, said semiconductor laser device emitting a laser light beam having a predetermined oscillation wavelength and a spectrum distribution which has a peak at said predetermined oscillation wavelength and which extends over a predetermined oscillation wavelength band including said predetermined oscillating wavelength, said optical isolator device transmitting said laser light beam as an incoming light beam which is propagated through said optical isolator device along a forward direction and cutting off a return light beam from said optical fiber that is propagated through said optical isolator device along a backward direction opposite to said forward direction, said optical isolator device comprising at least two optical isolator elements each of which comprises a pair of polarizers and a magneto-optical element disposed between said polarizers, said optical isolator elements being arranged along a common optical axis, each of said optical isolator elements having an element cutoff wavelength band for said return light beam that is defined by an element cutoff central wavelength, the improvement wherein said optical isolator device has a cutoff wavelength band for said return light beam that is defined by a cutoff central wavelength substantially equal to said predetermined oscillation wavelength, a first one of said optical isolator elements having a first element cutoff central wavelength shorter than said cutoff central wavelength of the optical isolator device and having a first element cutoff wavelength band which includes both said first element cutoff central wavelength and said cutoff central wavelength of the optical isolator device, a second one of said optical isolator elements having a second element cutoff central wavelength longer than said cutoff central wavelength of the optical isolator device and having a second element cutoff wavelength band which includes both said second element cutoff central wavelength and said cutoff central wavelength of the optical isolator device, each of said first and said second element cutoff wavelength bands having a wavelength range where transmittance is equal to zero, said first and said second ones of the optical isolator elements having a common wavelength area where said first and said second element cutoff wavelength bands overlap each other, said first and said second element cutoff wavelength bands collectively covering said predetermined oscillation wavelength band, whereby said optical isolator device carries out a sufficient isolation having an isolation characteristic greater than −70 dB in said predetermined oscillation wavelength band so as to cut off a noise light beam in said return light beam.

2. An optical isolator device as claimed in claim 1, wherein said first one of the optical isolator elements comprises the pair of said polarizers each having a polarizer cutoff wavelength band for said return light beam that is defined by a polarizer cutoff central wavelength shorter than said cutoff central wavelength of the optical isolator device, said second one of the optical isolator elements comprising the pair of said polarizers each having another polarizer cutoff wavelength band for said return light beam that is defined by another polarizer cutoff central wavelength longer than said cutoff central wavelength of the optical isolator device.

3. An optical isolator device as claimed in claim 1, wherein said first one of the optical isolator elements comprises the pair of said polarizers having the polarizer cutoff wavelength bands which are substantially equal to each other, said second one of the optical isolator elements comprising the pair of said polarizers having the other polarizer cutoff wavelength bands which are substantially equal to each other.

4. An optical isolator device as claimed in claim 1, wherein each of said polarizers comprises a polarizing beam splitter.

5. An optical isolator device as claimed in claim 1, wherein said optical isolator elements are two in number, a first of said optical isolator elements having its said magneto-optical element disposed between a polarizer and an analyzer having respective planes of polarization inclined at 45° to one another, the second of said optical isolator elements having its said magneto-optical element disposed between a polarizer and an analyzer having respective planes of polarization inclined at 45° to one another, the plane of polarization of said analyzer of the first optical isolator element coinciding with the plane of polarization of the polarizer of said second of said optical isolator elements.

6. An optical isolator device as claimed in claim 1, wherein the common wavelength area where said first and said second element cutoff bands overlap define a band width in which said predetermined oscillation wavelength is contained, said isolation characteristic which is greater than −70db extending throughout the entirety of said band width of the overlapping cutoff bands.

* * * * *